Nov. 23, 1948.     E. C. WOODS     2,454,750

TIRE FOR VEHICLES

Filed May 21, 1945

Inventor
Edgar C. Woods
By
Stebbins, Blenko & Webb
Attorneys

Patented Nov. 23, 1948

2,454,750

UNITED STATES PATENT OFFICE 2,454,750

TIRE FOR VEHICLES

Edgar Charles Woods, Gravesend, England, assignor to Henley's Tyre & Rubber Company, Darking, England, a British company Application May 21, 1945, Serial No. 594,816
In Great Britain May 31, 1944

6 Claims. (Cl. 152—209)

This invention relates to tires for vehicles and deals with the formation of the rubber tread, "rubber" being here used to cover synthetic, substitute or natural rubber. The type of tread to which the invention relates is that in which a part or the whole of the surface is formed by a circumferential line of isolated sections which follow each other in sequence round the periphery. By "isolated" is here meant that the body of rubber forming the section stands up above the directly adjacent parts of the tread on all sides. A sequence of such sections may, for instance, be provided by a rib divided into short lengths by transverse grooves or slits each extending to an appropriate depth below the running surface, usually to the full depth by which the rib stands up above the rubber directly alongside it.

The words "grooves" and "slits" are here used to distinguish between parallel sided channels of different widths. The word "slits" indicates that the width is such that under compression on the road surface the opposite sides of the channel are brought into contact, whereas "grooves" indicates that the width is so great that the expansion of the rubber under that compression does not bring the sides into contact.

It is known that with this type of tread formation considerable noise may be produced by the impacts of the leading points or edges of the sections in rapid succession upon the road surface. It is the object of the present invention to produce a form of tread in which this capacity for producing noise is greatly reduced while the need for dividing the circumferential ribs into separate elements in order to obtain improved grip on the road is met.

In describing the improved tread it will be assumed that the cylindrical surface of the tire has been developed on a plane so that it will be possible to speak of straight lines as defining portions of the tread, although in the actual tire these lines will necessarily be curved, at least in one plane.

In the improved tread the isolated sections are arranged in sequence with uniform pitch and are separated from each other by straight transverse grooves or slits which make different angles with the circumferential central line of the tread. It is found that it is not necessary to have a large number of different angles. Two angles appropriately chosen may suffice. The distribution of the different angles is, however, so arranged that in all, or in a large proportion of the sections, the angles at the two ends of a section are different. The result of this arrangement is that, while the pitch of the sections is uniform, the circumferential distances between leading points of successive sections vary in value, so that the time intervals between successive impacts of leading corners of the sections on the road also vary.

The invention will be further described by the aid of the accompanying drawings, which illustrate several forms of treads embodying it.

Figure 1:
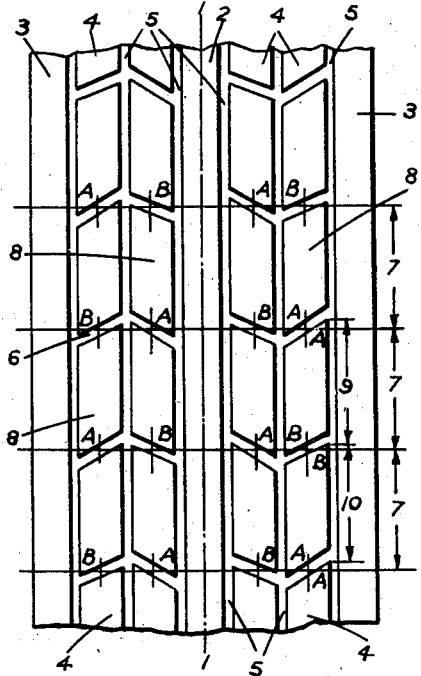
Figure 1 is a development on a flat surface showing one form of tread pattern in accordance with the invention.
Figure 2:
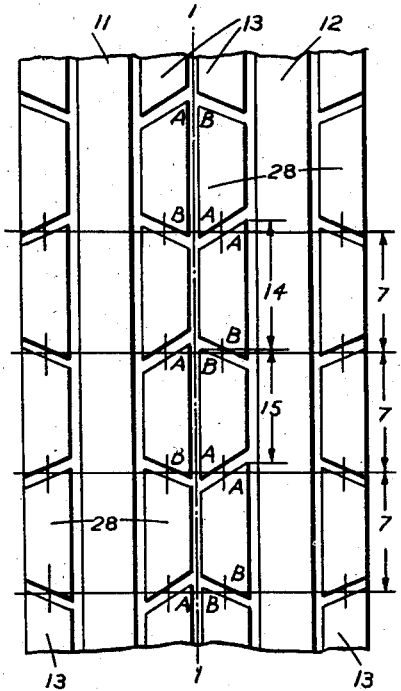
Figure 2 is a similar view of another form of pattern.

As usual, each of the patterns shown in Figures 1 and 2 is symmetrical about the circumferential centre line 1—1 of the tire. In Figure 1 there is a central continuous rib 2 and a continuous rib 3 at each side. Between the rib 2 and each rib 3 are two straight ribs 4 which have been divided into sections by transverse grooves 6 in accordance with the invention. The ribs 4 are separated from each other and from the ribs 2 and 3 by narrow circumferential grooves 5. The sub-division of the ribs 4 by transverse grooves 6 is carried out in such a way that the pitch of the sections is uniform. This pitch is shown by the distances 7, which are distances between points located in the middle of the length and the middle of the width of adjacent transverse grooves 6. The widths of all of the grooves 6 are the same throughout the periphery.

Each section 8 is a trapezoid having two parallel sides formed by the sides of the rib and two non-parallel sides formed by the walls of transverse grooves 6 which grooves are inclined in the same sense, but at different angles to the circumferential centre line 1—1. The different angles are indicated by A and B and it will be seen that in each of the trapezoids 8 the difference in angles exists and that as a result the circumferential distance between the leading corners of successive sections has two different values which occur alternately in proceeding along one of the ribs 4. These two values are indicated by the distances 9 and 10, the distance 9 being greater than the pitch 7 and the distance 10 being less than the pitch 7. In the example illustrated, the angle A is 60° and the angle B is 70° and with these values and the proportions shown the difference between the lengths 9 and 10 is about 7%.

In Figure 2 there are two undivided circumferential ribs 11 and 12 and four divided ribs 13. As compared with Figure 1 there is the characteristic difference that the inclinations to the circumferential centre line 1—1 of the two non-parallel sides of the trapezoids 28 into which the ribs 13 are sectionalized are in opposite senses instead of in the same sense. This has no effect on the relationship of the two lengths 14 and 15 (which correspond to the lengths 9 and 10 of Figure 1) to the pitch 7. For the same dimensions of the sections (i. e. pitch and width of sections and width of transverse grooves) and the same angles A and B these dimensions are the same in the two different forms of sections, 8 of Figure 1 and 28 of Figure 2.

An intermediate value for the distance between leading corners of successive sections can be obtained without having more than two different angles. If instead of taking the angles for a circumferential sequence of sections (B—A) (A—B) (B—A) as in Figures 1 and 2, the angles are arranged in the sequence (B—A) (A—A) (A—B) (B—B) (B—A) we get in addition to the two lengths, such as 9 and 10, Figure 1, and 14 and 15, Figure 2, for this distance. a third length interposed between them and equal to the pitch 7.

Figure 3:
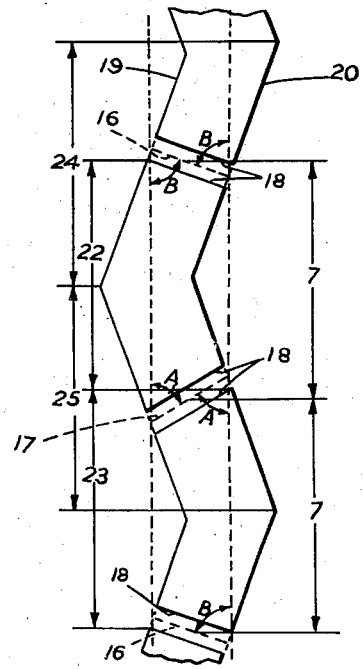
Figure 3 is a diagram used in explanation of the manner in which the invention can be applied to patterns having zig-zag or waved ribs.

A greater number of angles than two may also be chosen if desired if a bigger number of different values for the distance between successive corners is desired. The principle of design can also be applied in other ways, for instance, instead of straight ribs, the sub-division may be applied to zig-zag or waved ribs. The manner in which this is done will be appreciated by reference to Figure 3.

Here the broken lines show a straight rib divided into trapezoidal sections by lines 16 and 17, the line 16 making an angle B with the circumferential centre line and the line 17 making an angle A with that line, the arrangement being similar to the sub-division of the ribs 13 in Figure 2, the pitch, again indicated by the reference 7, being constant along the rib. The lines 16 and 17 may be taken as defining the division between sections and to draw in the zig-zag rib, lines 19 and 21 are drawn through the ends of these lines 16 and 17 making the desired angle, in this case 20°, with the circumferential centre of the line of the tread. The width of transverse groove is then inserted by drawing lines 18 parallel with lines 16 and 17. It will be seen that, by this method of drawing, distances between successive leading corners of sections have two values similar to those obtained in Figures 1 and 2, these distances being here indicated by lines 22 and 23 and that the outwardly projecting corners of the lines 19 and 21 are also spaced apart circumferentially by two different distances, here indicated by the dimensions 24 and 25. Accordingly, an effect in reducing noise due to these corners, similar to that obtained with the leading corners of the sections, is also obtained. Waved ribs can be produced in the same manner by rounding off the angles of the zig-zags by tangential arcs.

The maintenance of uniformity of pitch of the sections and the simple form of the variation in the pattern obtained in accordance with the present invention are of considerable importance, both in getting uniformity of wear of the tread surface and in facilitating the manufacture of the mould for the tire.

What I claim as my invention is:

1. A tire having a rubber tread comprising a circumferential line of isolated sections separated by straight transverse parallel-sided channels, some of which channels make, with the circumferential centre line of the tread, angles different from the angles made by the other channels with said centre line, the sections being of uniform pitch measured circumferentially between the mid-points of adjacent channels and having different values in sequence circumferentially for the distance between leading points of successive sections.

2. A tire having a rubber tread comprising a straight parallel-sided circumferential rib separated by straight transverse parallel-sided channels at uniform pitch measured circumferentially between the mid-points of adjacent channels into trapezoids of which the two non-parallel sides are inclined in the same sense and at different angles to the circumferential centre line of the tread.

3. A tire having a rubber tread comprising a straight circumferential parallel-sided rib separated by straight transverse parallel-sided channels at uniform pitch measured circumferentially between the mid-points of adjacent channels into trapezoids of which the two non-parallel sides are inclined in opposite senses and at different angles to the circumferential centre line of the tread.

4. A tire having a rubber tread comprising a circumferential zig-zag rib, the form of which is obtained by taking a pair of parallel straight lines representing a straight rib, dividing the space between said lines by straight transverse parallel-sided channels at uniform pitch measured circumferentially between the mid-points of adjacent channels into trapezoids, of which the two non-parallel sides are inclined in opposite senses and at different angles to the parallel sides thereof, and then drawing through the ends of the said non-parallel sides zig-zag lines which all make the angles of the same value with the said parallel sides.

5. A tire having a rubber tread comprising a circumferential line of sections arranged in sequence and separated by straight transverse parallel-sided channels at uniform pitch, measured circumferentially between the mid-points of adjacent channels, said channels in at least a large proportion of the sections making different angles at the two ends of a section with the circumferential centre line of the tread, thereby producing different values in sequence for the circumferential distance between leading points of successive sections.

6. A tire having a rubber tread comprising a rib periodically deflecting laterally in opposite directions from a straight circumferential line, said rib being divided transversely in the regions midway between the points at which it changes direction by straight parallel-sided channels at uniform pitch measured circumferentially between the mid-points of adjacent channels, some of which channels make with the circumferential centre line of the tread, angles different from the angles made by the other channels with the said centre line.

EDGAR CHARLES WOODS.

REFERENCES CITED

The following references are of record in the file of this patent:

UNITED STATES PATENTS

| Number | Name | Date |
|---|---|---|
| 1,201,744 | Kremer | Oct. 17, 1916 |
| 1,203,015 | Schmitt | Nov. 7, 1916 |
| 1,835,639 | Dolding | Dec. 8, 1931 |
| 1,956,011 | Evans | Apr. 24, 1934 |
| 1,999,988 | Anderson | Apr. 30, 1935 |

FOREIGN PATENTS

| Number | Country | Date |
|---|---|---|
| 13,560 | Great Britain | 1910 |